United States Patent
Kim et al.

(10) Patent No.: US 10,087,829 B2
(45) Date of Patent: Oct. 2, 2018

(54) VARIABLE COMPRESSION RATIO DEVICE

(71) Applicant: Hyundai Motor Company, Seoul (KR)

(72) Inventors: Won Gyu Kim, Seoul (KR); Myungsik Choi, Seoul (KR); Gyu Han Hwang, Yongin-si (KR)

(73) Assignee: Hyundai Motor Company, Seoul (KR)

( * ) Notice: Subject to any disclaimer, the term of this patent is extended or adjusted under 35 U.S.C. 154(b) by 118 days.

(21) Appl. No.: 15/365,819

(22) Filed: Nov. 30, 2016

(65) Prior Publication Data

US 2018/0087455 A1    Mar. 29, 2018

(30) Foreign Application Priority Data

Sep. 26, 2016  (KR) .................... 10-2016-0123277

(51) Int. Cl.
*F02B 75/04*    (2006.01)
*F16J 1/16*    (2006.01)
*F16C 7/06*    (2006.01)

(52) U.S. Cl.
CPC .............. *F02B 75/04* (2013.01); *F16C 7/06* (2013.01); *F16J 1/16* (2013.01)

(58) Field of Classification Search
CPC ...... F02B 75/04; F02B 75/044; F02B 75/045; F16C 7/06; F16J 1/16
See application file for complete search history.

(56) References Cited

U.S. PATENT DOCUMENTS

| 9,784,305 | B2 * | 10/2017 | Wittek ...................... F16C 7/06 |
| 2014/0020660 | A1 * | 1/2014 | Lee ........................ F02B 75/045 |
| | | | 123/48 B |
| 2015/0075497 | A1 * | 3/2015 | Hutzelmann ......... F02B 75/044 |
| | | | 123/48 A |

FOREIGN PATENT DOCUMENTS

| JP | 03-242434 A | 10/1991 |
| JP | 2009-108864 A | 5/2009 |
| KR | 2010-0062721 A | 6/2010 |
| KR | 10-2011-0037392 A | 4/2011 |

* cited by examiner

*Primary Examiner* — Jacob Amick
(74) *Attorney, Agent, or Firm* — Morgan, Lewis & Bockius LLP

(57) ABSTRACT

A variable compression ratio device may include a piston pin having first and second plunger spaces, a plunger device including a first plunger that is disposed to reciprocate in the first plunger space, a second plunger and a connection pipe that connects between the first and second plungers, a first check valve disposed in a first check space to move oil from a pipe passage to the first check space in a first direction, a second check valve disposed in a second check space to move the oil from the pipe passage to a second check space in a second direction; and a return member elastically supporting the second plunger to one side.

20 Claims, 10 Drawing Sheets

US 10,087,829 B2

VARIABLE COMPRESSION RATIO DEVICE

CROSS-REFERENCE TO RELATED APPLICATION

The present application claims priority to Korean Patent Application No. 10-2016-0123277 filed on Sep. 26, 2016, the entire contents of which is incorporated herein for all purposes by this reference.

BACKGROUND OF THE INVENTION

Field of the Invention

The present invention relates to an internal combustion engine, and more particularly, to a variable compression ratio device configured for improving fuel efficiency and improving an output of an internal combustion engine by changing a compression ratio within a combustion chamber of the internal combustion engine depending on operation conditions of the engine.

Description of Related Art

Generally, thermal efficiency of a heat engine is increased as a compression ratio is increased. In the case of a spark ignition engine, if ignition timing is advanced up to a predetermined level, the thermal efficiency is increased.

However, in the case of the spark ignition engine, if the ignition timing is advanced at a high combustion ratio, an abnormal combustion occurs, and therefore the engine may be damaged. As a result, the advance of the ignition timing is limited, and therefore an output of the engine may deteriorate.

A variable compression ratio (VCR) device is a device for changing a compression ratio of a mixer depending on an operation state of the engine.

The variable compression ratio device increases the compression ratio of the mixer in a low load condition of the engine to improve fuel consumption and decreases the compression ratio of the mixer in a high load condition of the engine to prevent knocking from occurring and improve the output of the engine.

In the case of the current diesel engine, to meet tightened exhaust gas regulations, a volume of a piston combustion chamber is increased to reduce the compression ratio, thereby implementing low temperature combustion and since cold starting performance deteriorates as the compression ratio is decreased, a glow system needs to be made of a ceramic material for strengthening rigidity thereof and a separate control unit for controlling the glow system needs to be added, such that manufacturing costs thereof may be increased.

Therefore, research on a relatively simple new structure of implementing a variable compression ratio by controlling a position of a piston has been conducted and a structure of rotating an eccentric cam by a hydraulic pressure to get a piston to go up and down has been developed.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a variable compression ratio device having advantage of decreasing fuel consumption and improving an output of an engine by changing a compression ratio of a mixer depending on operation conditions of the engine.

Various aspects of the present invention are directed to providing a variable compression ratio device supplying oil to a first chamber or supplying the oil to a second chamber to get a top dead center of a piston to go up and down, including: a piston pin having first and second plunger spaces provided at one side and the other side therein, provided with a partition wall passage connecting between the first and second plunger spaces, provided with a first chamber connection passage connecting between the first chamber and the first plunger space and a second chamber connection passage connecting between the second chamber and the second plunger space, and provided with each of the first and second supply passages through which the oil is supplied to the first and second plunger spaces; a plunger device including a first plunger that is disposed to reciprocate in the first plunger space, having a first check space formed therein, and provided with a first check passage connected to an outer circumferential surface from the first check space while the first check passage corresponding to the first chamber connection passage; a second plunger that is disposed to reciprocate in the second plunger space, having a second check space formed therein, and provided with a second check passage connected to an outer circumferential surface from the second check space while the second check passage corresponding to the second chamber connection passage; and a connection pipe that connects between the first and second plungers through the partition wall passage and has a pipe passage connecting between the first and second check spaces and is provided with an open passage from an inside circumferential surface toward an outer circumferential surface; a first check valve disposed in the first check space to move oil from the pipe passage to the first check space in one direction and a second check valve disposed in the second check space to move the oil from the pipe passage to the second check space in one direction; and a return member elastically supporting the second plunger to one side.

In a state in which the first plunger and the second plunger are moved to one side, the second check passage and the second chamber connection passage may be connected to each other, the oil supplied through the first supply passage and the oil of the first chamber may be supplied to the second chamber through the open passage, the pipe passage, the second check valve, the second check passage, and the second chamber connection passage.

In a state in which the first plunger and the second plunger are moved to the other side, the first check passage and the first chamber connection passage may be connected to each other, the oil supplied through the second supply passage and the oil of the second chamber may be supplied to the first chamber through the open passage, the pipe passage, the first check valve, the first check passage, and the first chamber connection passage to implement a high compression ratio.

An outer diameter of the first plunger may be larger than an inner diameter of the partition wall passage and an outer diameter of the second plunger may be larger than an inner diameter of the partition wall passage.

The outer diameter of the first plunger may be equal to that of the second plunger.

The first supply passage and the second supply passage may be each connected to the first plunger space and the second plunger space, the oil supplied through the first supply passage may be operated to move the first plunger to one side, and the oil supplied through the second supply passage may be operated to move the second plunger to the other side.

When a force of the return member and a force of an oil pressure supplied through the first supply passage are larger than that of the oil pressure supplied through the second supply passage, the second check passage and the second chamber connection passage may be connected to each other, the oil supplied through the first supply passage and the oil of the first chamber may be supplied to the second chamber through the open passage, the pipe passage, the second check valve, the second check passage, and the second chamber connection passage to implement a low compression ratio.

When a force of an oil pressure supplied through the second supply passage is larger than that of the return member and that of the oil pressure supplied through the first supply passage, the first check passage and the first chamber connection passage may be connected to each other, the oil supplied through the second supply passage and the oil of the second chamber are supplied to the first chamber through the open passage, the pipe passage, the first check valve, the first check passage, and the first chamber connection passage to implement a high compression ratio.

The return member may be an elastic member disposed in the second plunger space to elastically support the second plunger to one side.

The variable compression ratio device may further include: an eccentric cam rotatably disposed on an outer circumferential surface of the piston pin connecting between the piston and a connecting rod, in which the oil supplied to the first chamber may rotate the eccentric cam in one direction by a predetermined angle to get the top dead center of the piston to go up, and the oil supplied to the second chamber may rotate the eccentric cam in the other direction by a predetermined angle to get the top dead center of the piston to go down.

The first chamber may be disposed at an upper portion of the piston pin in the piston and the oil supplied to the first chamber may get the top dead center of the piston to go up and the second chamber may be disposed at a lower portion of the piston pin in the piston and the oil supplied to the second chamber may get the top dead center of the piston to go down.

The open passage may be connected to the first plunger space in the state in which the first and second plungers are moved in one direction and the open passage may be connected to the second plunger space in the state in which the first and second plungers are moved in the other direction.

Various aspects of the present invention are directed to providing a variable compression ratio device supplying oil to a first chamber or supplying the oil to a second chamber to get a top dead center of a piston to go up and down, including: a piston pin having first and second plunger spaces connected to each other at one side and the other side therein, provided with a first chamber connection passage connecting between the first chamber and the first plunger space and a second chamber connection passage connecting between the second chamber and the second plunger space, and provided with a supply passage through which the oil is supplied to the second plunger space; a plunger device including a first plunger that is disposed to reciprocate, having an outer circumferential surface corresponding to an inside circumferential surface of the first plunger space, has a first check space formed therein, and provided with a first check passage connected to an outer circumferential surface in the first check space, corresponding to the first chamber connection passage; a second plunger that is disposed to reciprocate, having an outer circumferential surface corresponding to an inside circumferential surface of the second plunger space, has a second check space formed therein, and provided with a second check passage connected to an outer circumferential surface in the second check space, corresponding to the second chamber connection passage; and a connection pipe that connects between the first and second plungers, has a pipe passage connecting between the first check space and the second check space, is provided with an open passage from an inside circumferential surface toward an outer circumferential surface, and has a sealing structure formed between the outer circumferential surface and an internal circumferential surface of a partition wall passage; a first check valve disposed in the first check space to move oil from the pipe passage to the first check space in one direction and a second check valve disposed in the second check space to move the oil from the pipe passage to the second check space in one direction; and a return member elastically supporting the second plunger to one side.

An outer diameter of the second plunger may be larger than that of the first plunger.

When a force of the return member is larger than that of an oil pressure supplied through the supply passage, the second check passage and the second chamber connection passage may be connected to each other, the oil supplied through the first supply passage and the oil of the first chamber may be supplied to the second chamber through the open passage, the pipe passage, the second check valve, the second check passage, and the second chamber connection passage to implement a low compression ratio.

When a force of the oil pressure supplied through the supply passage is larger than that of the return member, the first check passage and the first chamber connection passage may be connected to each other, the oil supplied through the second supply passage and the oil of the second chamber may be supplied to the first chamber through the open passage, the pipe passage, the first check valve, the first check passage, and the first chamber connection passage to implement a high compression ratio.

The variable compression ratio device may further include: an eccentric cam rotatably disposed on an outer circumferential surface of the piston pin connecting between the piston and a connecting rod, in which the oil supplied to the first chamber may rotate the eccentric cam in one direction by a predetermined angle to get the top dead center of the piston to go up, and the oil supplied to the second chamber may rotate the eccentric cam in the other direction by a predetermined angle to get the top dead center of the piston to go down.

The first chamber may be disposed at a lower portion of the piston pin in the piston and the second chamber may be disposed at an upper portion of the piston pin in the piston.

The open passage may include a first open passage connected to the first chamber connection passage in the connection pipe in the state in which the first and second plungers are moved to one direction; and a second open passage connecting between the supply passage and the second chamber connection passage in the state in which the first and second plungers are moved in the other direction.

The hydraulic pressure may be formed between one end surface of the first plunger and the first plunger space, and vent holes through which the hydraulic pressure formed between the other end surface of the second plunger and the second plunger space is discharged to the outside may be formed at both end portions of the piston pin, respectively.

The variable compression ratio device may further include: a check spring connecting between a first ball of the first check valve and a second ball of the second check valve and disposed to elastically pull the first and second balls to operate the first and second check valves.

According to the exemplary embodiment of the present invention, the control valve structure of controlling the hydraulic pressure may be configured in the piston pin and the top dead center of the piston may effectively rise and fall by the hydraulic pressure supplied to the control valve, easily implementing the high compression ratio and the low compression ratio.

In particular, the control value may quickly return the oil of the low pressure part to the high pressure part by the movement of the check valve and the plunger, quickly and accurately implementing the high compression ratio and the low compression ratio.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
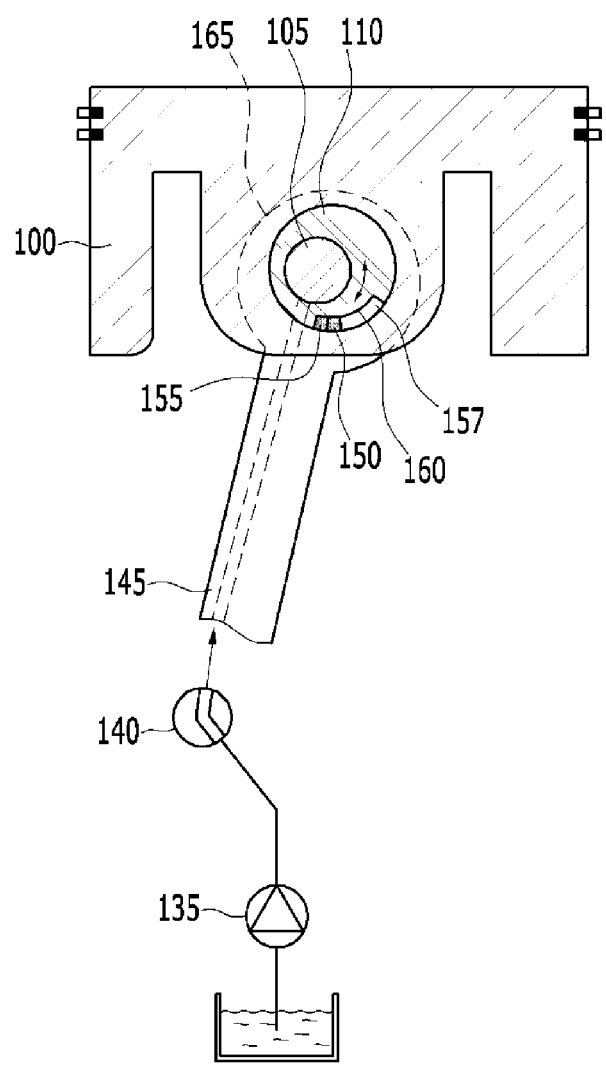
FIG. 1 is a schematic diagram of a variable compression ratio device according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention (s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, an exemplary embodiment of the present invention will be described in detail with reference to the accompanying drawings.

However, since sizes and thicknesses of the respective components were arbitrarily shown in the accompanying drawings for convenience of explanation, the present invention is not necessarily limited to contents shown in the accompanying drawings. In addition, thicknesses were exaggerated to obviously represent several portions and regions.

However, contents that are not associated with a description will be omitted to clearly describe an exemplary embodiment of the present invention, and components that are the same as or are similar to each other will be denoted by the same reference numerals throughout the present specification.

In the following description, the same components are classified into first, second, and the like to differentiate names for components and a sequence thereof is not necessarily limited thereto.

FIG. 1 is a schematic diagram of a variable compression ratio device according to an exemplary embodiment of the present invention.

Referring to FIG. 1, a variable compression ratio device includes a hydraulic pump 135, a crank pin 140, a connecting rod 145, a piston 100, a piston pin 105, an eccentric cam 110, and a small end portion 165.

The piston pin 105 penetrates through a lower central portion of the piston 100 and the small end portion 165 of the connecting rod 145 to connect between an upper end portion of the connecting rod 145 and a lower end portion of the piston 100 and the eccentric cam 110 is disposed between an outer circumferential surface of the piston 105 and an inside circumferential surface of the piston 100.

Further, the outer circumferential surface of the eccentric cam 110 is provided with a groove 160, in which the groove 160 is divided into a first chamber 155 and a second chamber 157 by a chamber separation wall 150.

Here, the variable compression ratio device has a structure in which the oil pumped by the hydraulic pump 135 is supplied to the piston pin 105 through the crank pin 140 and the connecting rod 145 and the oil is supplied to the first chamber 155 or supplied to the second chamber 157 depending on a movement of a plunger embedded in the piston pin 105.

According to the exemplary embodiment of the present invention, the variable compression ratio device has a structure in which when the oil is supplied to the first chamber 155, the eccentric cam 110 rotates clockwise by a predetermined angle and thus a top dead center of the piston 100 is increased and when the oil is supplied to the second chamber 157, the eccentric cam 110 rotates counterclockwise by the predetermined angle and thus the top dead center of the piston 100 is decreased.

An oil passage formed in the connecting rod 145 may be provided in two or one and a separate valve may be disposed between the hydraulic pump 135 and the crank pin 140 to supply oil to the two oil passages.

In addition, the piston pin 105 may be supplied with oil through two oil passages (2 channels), respectively or supplied with oil through one oil passage (1 channel).

Figure 7:
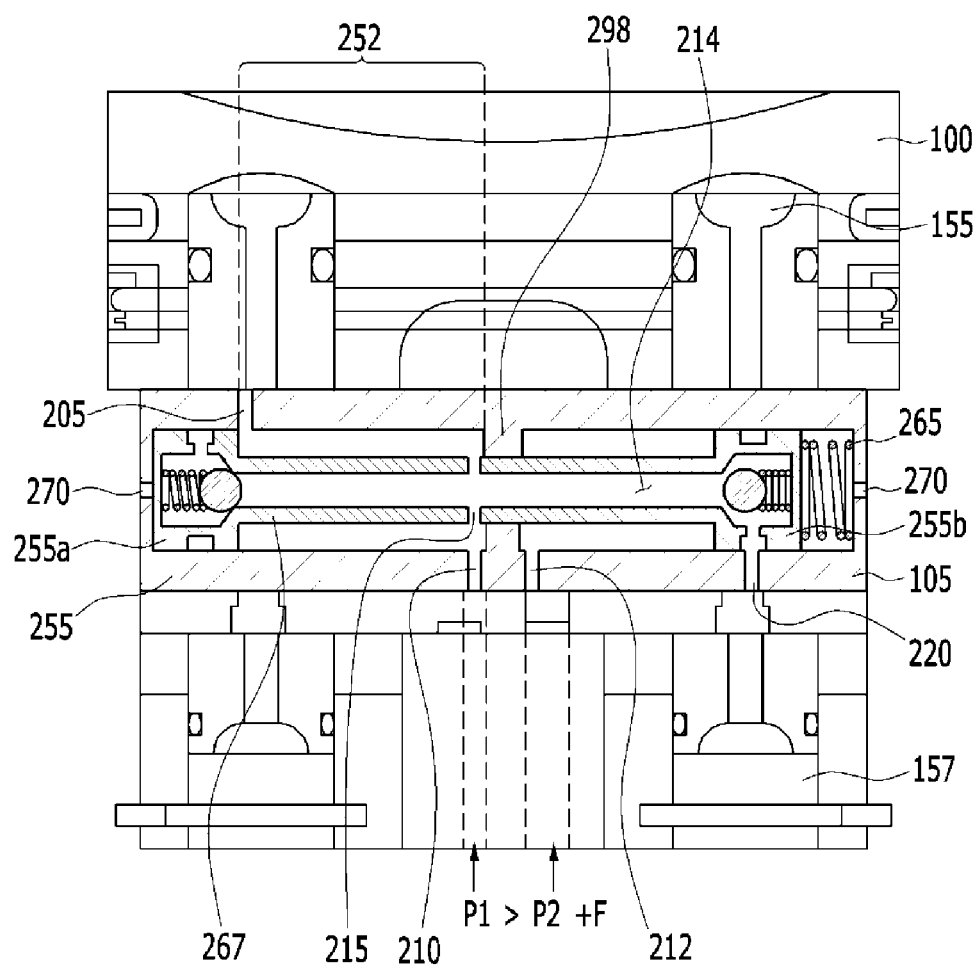
FIG. 7 is a cross-sectional view illustrating a low compression ratio mode of 2 channel piston pins in a variable compression ratio device according to another exemplary embodiment of the present invention.
Figure 8:
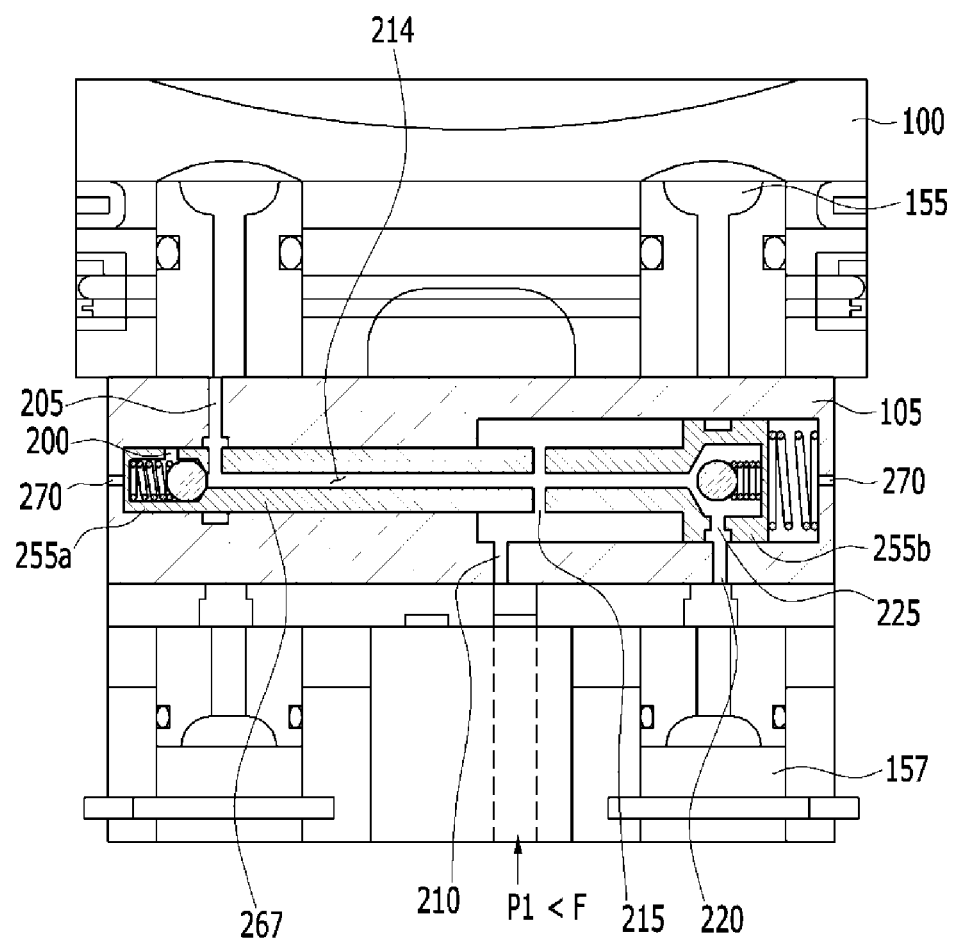
FIG. 8 is a cross-sectional view illustrating a low compression ratio mode of a 1 channel piston pin in a variable compression ratio device according to another exemplary embodiment of the present invention.

The structure in which the top dead center of the piston 100 rises or falls by the structure of the eccentric cam 110 is described with reference to FIG. 1. However, as illustrated in FIG. 7 or 8 to be described below, upper and lower portions of the piston 100 each may be selectively applied with the first chamber 155 and the second chamber 157 that get the top dead center of the piston 100 to go up and down.

Figure 2:
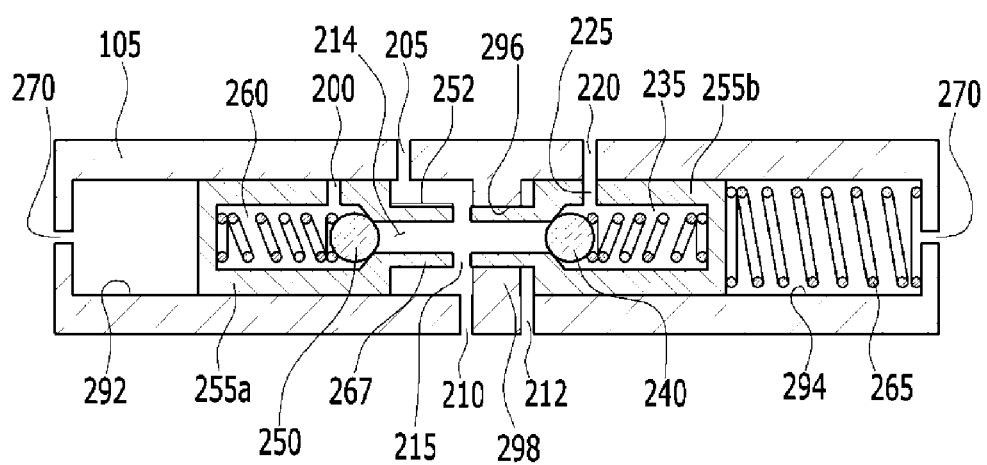
FIG. 2 is a cross-sectional view illustrating a low compression ratio mode of a 2 channel piston pin in the variable compression ratio device according to the exemplary embodiment of the present invention.

FIG. 2 is a cross-sectional view illustrating a low compression ratio mode of a 2 channel piston pin in the variable compression ratio device according to the exemplary embodiment of the present invention.

Referring to FIG. 2, one side (left in FIG. 2) in the piston 105 is provided with a first plunger space 292 and the other side (right in FIG. 2) therein is provided with a second plunger space 294.

A partition wall 298 is formed between the first plunger space 292 and the second plunger space 294 and a central portion of the partition wall 298 is provided with a partition wall passage 296 connecting between the first plunger space 292 and the second plunger space 294.

A vent hole 270 is provided outwardly from one end surface in the first plunger space 292 and the vent hole 270 is provided outwardly from the other end surface in the second plunger space 294.

The lower portion of the piston pin 105 is provided with a first supply passage 210 through which oil is supplied to the first plunger space 292 and a second supply passage 212 through which oil is supplied to the second plunger space 294 and the first supply passage 210 and the second supply passage 212 are formed to be adjacent to the partition wall 298.

Further, the piston pin 105 is provided with a first chamber connection passage 205 connected to the first chamber 155 in the first plunger space 292 and a second chamber connection passage 220 connected to the second chamber 157 in the second plunger space 294 and the first chamber connection passage 205 and the second chamber connection passage 220 are formed to be relatively far away from the wall partition 298, compared with the first supply passage 210 and the second supply passage 212.

The first plunger space 292 is provided with a first plunger 255a, a sealing structure is formed between an outer circumferential surface of the first plunger 255a and an inside circumferential surface of the first plunger space 292, the second plunger space 294 is provided with a second plunger 255b, and a sealing structure is formed between an outer circumferential surface of the second plunger 255b and an inside circumferential surface of the second plunger space 294.

A first check space 260 is provided in the first plunger 255a and a first check passage 200 is provided outwardly from the first check space 260. Here, the first check passage 200 selectively corresponds to the first chamber connection passage 205 depending on a movement position of the first plunger 255a.

A second check space 235 is provided in the second plunger 255b and a second check passage 225 is provided outwardly from the second check space 235. Here, the second check passage 225 selectively corresponds to the second chamber connection passage 220 depending on a movement position of the second plunger 255b.

A connection pipe 267 connects between the other end surface of the first plunger 255a and one end surface of the second plunger 255b and an inside thereof is provided with a pipe passage 214 connecting between the first check space 260 and the second check space 235.

The connection pipe 267 is provided with an open passage 215 from an inside circumferential surface toward an outer circumferential surface and the open passage 215 fluidically-communicates with the first plunger space 292 or the second plunger space 294 depending on a movement position of the connection pipe 267.

According to the exemplary embodiment of the present invention, the first check space 260 is provided with the first check valve 250, the first check valve 250 prevents oil of the first check space 260 from moving to the pipe passage 214 and moves the oil in one direction from the pipe passage 214 to the first check space 260.

In addition, the second check space 235 is provided with a second check valve 240, the second check valve 240 prevents oil of the second check space 235 from moving to the pipe passage 214, and moves the oil in one direction from the pipe passage 214 to the second check space 235.

As illustrated, an outer diameter of the connection pipe 267 includes a small diameter part 252 smaller than that of the first plunger 255a and the second plunger 255b and the outer diameter of the first plunger 255a and the outer diameter of the second plunger 255b are formed to be equal to each other.

A return member 265 is a spring type elastic member and elastically supports the other end surface of the second plunger 255b in the second plunger space 294 in one direction and may move the first plunger 255a, the connection pipe 267, and the second plunger 255b in one direction.

According to the exemplary embodiment of the present invention, referring to FIG. 1, when a sum P1+F of the force P1 of the oil supplied through the supply passage 210 and the force F of the return member 265 is larger than a force P2 of oil supplied through the second supply passage 212, the first plunger 255a, the connection pipe 267, and the second plunger 255b are moved in one direction (left direction).

Further, the oil supplied through the first supply passage 210 is supplied to the second chamber 157 through the open passage 215, the pipe passage 214, the second check valve 240, and the second chamber connection passage 220 and the oil of the first chamber 155 returns to the second chamber 157 through the first chamber connection passage 205, the open passage 215, the pipe passage 214, the second check valve 240, the second check passage 225, and the second chamber connection passage 220.

Accordingly, the piston 100 relatively falls with respect to the piston pin and the top dead center thereof falls, such that the low compression ratio (i.e., a compression ratio lower than a predetermined compression ratio) may be implemented.

For reference, the structure of the first plunger 255a, the second plunger 255b, and the connection pipe 267 may be called a plunger device (no reference numerals).

Figure 3A:
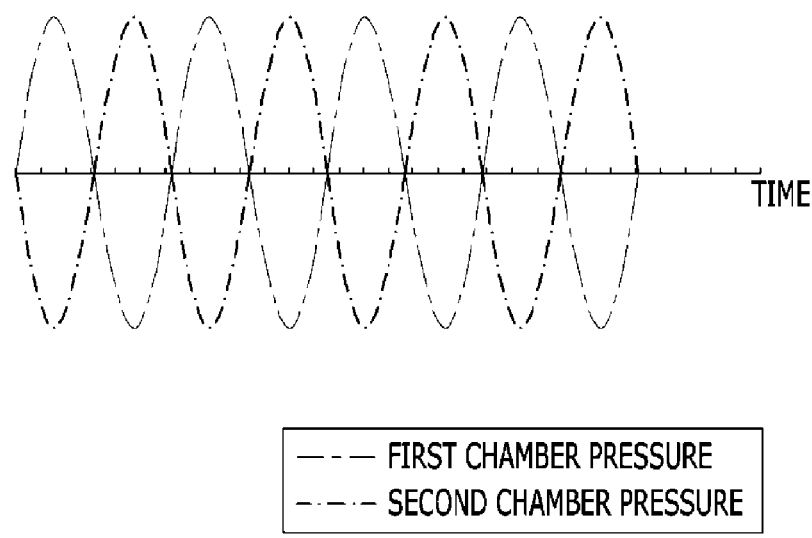
FIG. 3A and FIG. 3B are graphs illustrating a change in hydraulic pressure and characteristics of oil moved to a second chamber, in the low compression ratio mode of the variable compression ratio device according to the exemplary embodiment of the present invention.
Figure 3B:
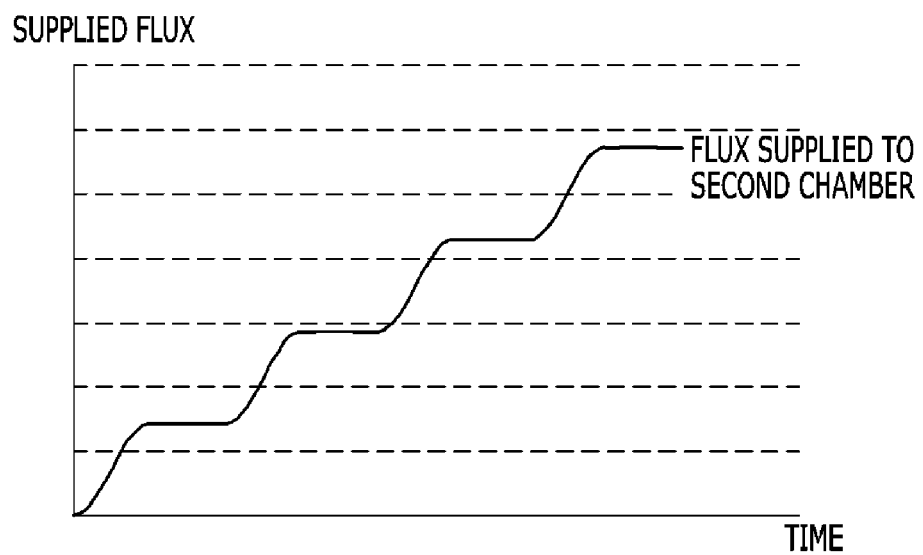

FIG. 3A and FIG. 3B are graphs illustrating a change in hydraulic pressure and characteristics of oil moved to a second chamber, in the low compression ratio mode of the variable compression ratio device according to the exemplary embodiment of the present invention.

Referring to FIG. 3A, a horizontal axis represents time, a vertical axis represents a hydraulic pressure, and the pressure of the first chamber 155 and the second chamber 157 is changed in an opposite direction to each other, having a predetermined period, depending on a change in force applied to the piston 100 when the engine is driven.

Referring to FIG. 3B, a horizontal axis represents time, a vertical axis represents the amount of oil supplied to the second chamber 157, and oil is sequentially supplied to the second chamber 157 depending on a change in force applied to the piston 100 when the engine is driven and the oil of the second chamber 157 does not return by the second check valve 240.

Figure 4:
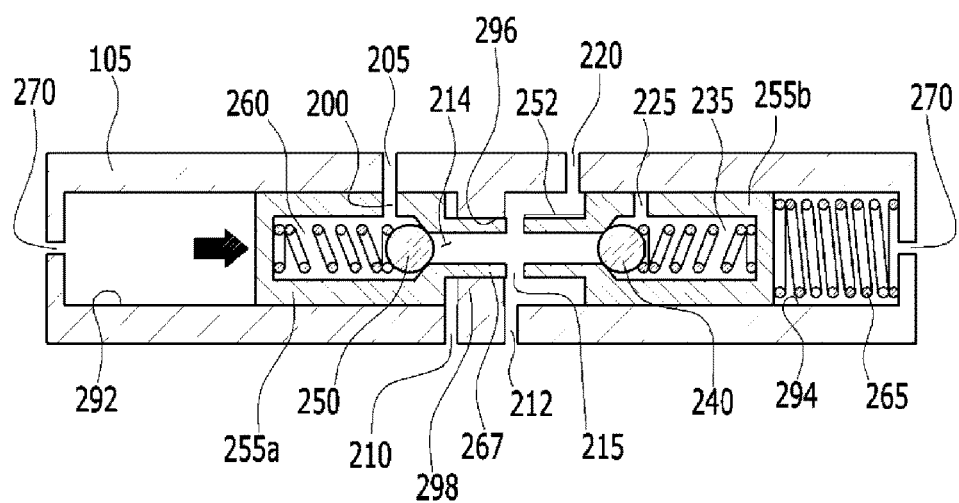
FIG. 4 is a cross-sectional view illustrating a high compression ratio mode of the 2 channel piston pins in the variable compression ratio device according to the exemplary embodiment of the present invention.

FIG. 4 is a cross-sectional view illustrating a high compression ratio mode of the 2 channel piston pin in the variable compression ratio device according to the exemplary embodiment of the present invention and main differences from FIG. 2 are described and the detailed description of the same or similar components will be omitted.

Referring to FIG. 4, considering a force P1 of the hydraulic pressure supplied through the first supply passage 210, a force P2 of the hydraulic pressure supplied through the second supply passage 212, and an elastic force F of the return member 265, under the condition that P1<P2+F, the first plunger 255a, the connection pipe 267, and the second plunger 255b move in the other direction while compressing the return member 265.

Therefore, the oil supplied through the first supply passage 210 is blocked by the first plunger 255a, the oil supplied to the second plunger space 294 through the second supply passage 212 is sequentially supplied to the first chamber 155 through the open passage 215, the pipe passage 214, the first check valve 250, the first check space 260, the first check passage 200, and the first chamber connection passage 205.

Further, the oil of the second chamber 157 returns to the first chamber 155 through the second chamber connection passage 220, the open passage 215, the pipe passage 214, the first check valve 250, the first check passage 200, and the first chamber connection passage 205 depending on the change in pressure.

Accordingly, the piston 100 relatively rises with respect to the piston pin 105 and the top dead center thereof rises, such that the high compression ratio (i.e., a compression ratio higher than a predetermined compression ratio) may be implemented.

Figure 5:
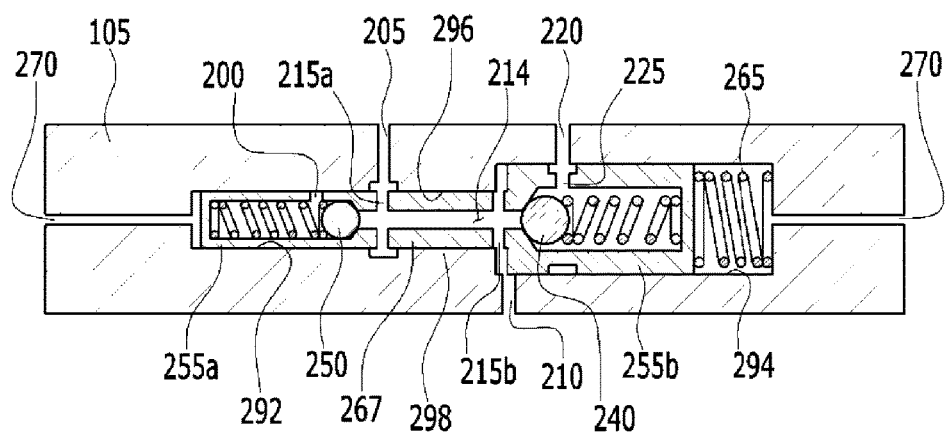
FIG. 5 is a cross-sectional view illustrating a low compression ratio mode of a 1 channel piston pin in the variable compression ratio device according to the exemplary embodiment of the present invention.

FIG. 5 is a cross-sectional view illustrating a low compression ratio mode of a 1 channel piston pin in the variable compression ratio device according to the exemplary embodiment of the present invention.

Referring to FIG. 5, one side in the piston pin 105 is provided with the first plunger space 292, the other side in the piston pin 105 is provided with the second plunger space 294, and the first plunger space 292 and the second plunger space 294 are connected to each other. Describing in more detail, the partition wall 298 is formed between the first plunger space 292 and the second plunger space 294 and the partition wall passage 296 is formed at the central portion of the partition wall 298.

The supply passage 210 supplying oil to the second plunger space 294 is formed at the lower portion of the piston pin 105 and the first chamber connection passage 205 connected to the first chamber 155 in the first plunger space 292 is formed at the upper portion of the piston pin 105.

Further, the piston pin 105 is provided with the vent hole 270 that is outwardly from one end surface in the first plunger space 292 and the vent hole 270 that is outwardly from the other end surface in the second plunger space 294.

The inside of the first plunger space 292 is provided with the first plunger 255a having the piston structure, the inside of the second plunger space 294 is provided with the second plunger 255b having the piston structure, and the first plunger 255a and the second plunger 255b are disposed to reciprocate to one direction (left) and the other direction (right).

The connection pipe 267 connects between the first plunger 255a and the second plunger 255b through the partition wall passage 296 and the sealing structure is formed between an outer circumferential surface of the connection pipe 267 and an inside circumferential surface of the partition wall.

The inside of the first plunger 255a is provided with the first check space 260, the inside of the second plunger 255b is provided with the second check space 235, the inside of the connection pipe 267 is provided with the pipe passage 214 in a longitudinal direction, and the pipe passage 214 connects between the first check space 260 and the second check space 235.

A position set from an inside circumferential surface of the connection pipe 267 toward an outer circumferential surface thereof is provided with a first open passage 215a and the first open passage 215a selectively corresponds to the first chamber connection passage 205.

That is, the first open passage 215a and the first chamber connection passage 205 correspond to each other in the state in which the first plunger 255a, the connection pipe 267, and the second plunger 255b are moved to one side.

Further, a position set to be from the inside circumferential of the connection pipe 267 toward the outer circumferential surface thereof is provided with a second open passage 215b and the first open passage 215a is always connected to the second plunger space and always connected to the supply passage 210.

The first check space 260 is provided in the first plunger 255a and the first check passage 200 is provided outwardly from the first check space 260. Here, the first check passage 200 selectively corresponds to the first chamber connection passage 205 depending on a movement position of the first plunger 255a.

The second check space 235 is provided in the second plunger 255b and the second check passage 225 is provided outwardly from the second check space 235. Here, the second check passage 225 selectively corresponds to the second chamber connection passage 220 depending on the movement position of the second plunger 255b.

According to the exemplary embodiment of the present invention, the first check space 260 is provided with the first check valve 250, the first check valve 250 prevents oil of the first check space 260 from moving to the pipe passage 214 and moves the oil in one direction from the pipe passage 214 to the first check space 260.

In addition, the second check space 235 is provided with a second check valve 240, the second check valve 240 prevents oil of the second check space 235 from moving to the pipe passage 214, and moves the oil in one direction from the pipe passage 214 to the second check space 235.

As illustrated, the outer diameter of the connection pipe 267 is equal to that of the first plunger 255a and is smaller than that of the second plunger 255b.

The return member 265 is a spring type elastic member and elastically supports the other end surface of the second plunger 255b in the second plunger space 294 in one direction and may move the first plunger 255a, the connection pipe 267, and the second plunger 255b in one direction.

According to the exemplary embodiment of the present invention, referring to FIG. 5, when the force F of the return member 265 is larger than the force P1 of the oil supplied through the supply passage 210, the first plunger 255a, the connection pipe 267, and the second plunger 255b are moved in one direction (left direction).

Further, the oil supplied through the supply passage 210 is supplied to the second chamber 157 through the second open passage 215b, the pipe passage 214, the second check valve 240, the second check passage 225, and the second chamber connection passage 220 and the oil of the first chamber 155 returns to the second chamber 157 through the first chamber connection passage 205, the first open passage 215a, the pipe passage 214, the second check valve 240, the second check passage 225, and the second chamber connection passage 220.

Therefore, the top dead center of the piston falls, such that the low compression ratio may be implemented.

Figure 6:
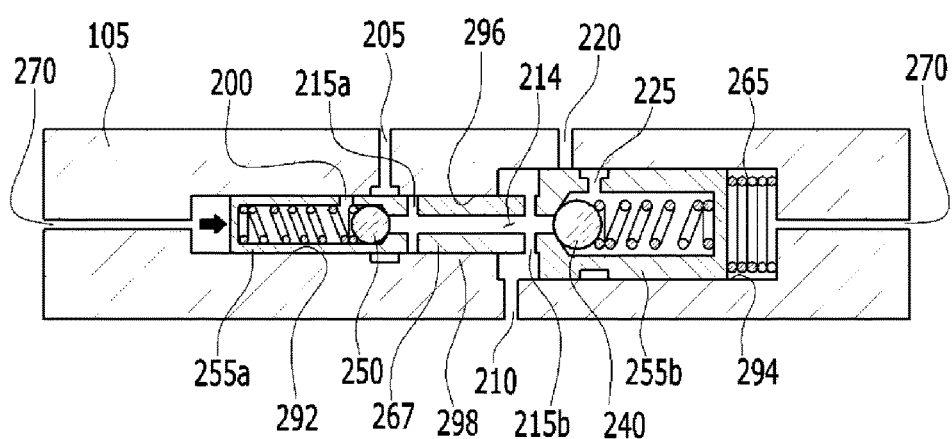
FIG. 6 is a cross-sectional view illustrating a high compression ratio mode of the 1 channel piston pin in the variable compression ratio device according to the exemplary embodiment of the present invention.

FIG. 6 is a cross-sectional view illustrating a high compression ratio mode of a 1 channel piston pin in the variable compression ratio device according to the exemplary embodiment of the present invention and main differences from FIG. 5 are described and the detailed description of the same or similar components will be omitted.

Referring to FIG. 6, considering the force P1 of the hydraulic pressure supplied through the supply passage 210 and the elastic force F of the return member 265, under the condition that P>F, the first plunger 255a, the connection pipe 267, and the second plunger 255b move in the other direction while compressing the return member 265.

Therefore, the oil supplied to the second plunger space 294 through the supply passage 210 is sequentially supplied to the first chamber 155 through the second open passage 215b, the pipe passage 214, the first check valve 250, the first check space 260, the first check passage 200, and the first chamber connection passage 205.

Further, the oil of the second chamber 157 returns to the first chamber 155 through the second chamber connection passage 220, the second open passage 215b, the pipe passage 215, the first check valve 250, the first check passage 200, and the first chamber connection passage 205 depending on the change in pressure.

Therefore, the top dead center of the piston 100 rises, such that the high compression ratio may be implemented.

FIG. 7 is a cross-sectional view illustrating a low compression ratio mode of the 2 channel piston pin in the variable compression ratio device according to another exemplary embodiment of the present invention and main differences from FIGS. 2 and 4 are described and the detailed description of the same or similar components will be omitted.

The structure of the piston pin 104 is the same as or similar to FIGS. 2 and 4, and therefore the description thereof will be omitted. However, the first chamber 155 is formed over the piston pin 105 and the second chamber 157 is formed under the piston pin 105.

Therefore, when the hydraulic pressure is sequentially supplied to the second chamber 157 through the second chamber connection passage 220 of the piston pin 105 and the oil of the first chamber 155 sequentially returns to the second chamber 157, the piston 100 falls with respect to the piston pin 105, such that the low compression ratio may be implemented.

FIG. 8 is a cross-sectional view illustrating a low compression ratio mode of a 1 channel piston pin in a variable compression ratio device according to another exemplary embodiment of the present invention.

The structure of the piston pin 104 is the same as or similar to FIG. 5 and FIG. 6, and therefore the description thereof will be omitted. However, the first chamber 155 is formed over the piston pin 105 and the second chamber 157 is formed under the piston pin 105.

Therefore, when the hydraulic pressure is sequentially supplied to the second chamber 157 through the second chamber connection passage 220 of the piston pin 105 and the oil of the first chamber 155 sequentially returns to the second chamber 157, the piston 100 falls with respect to the piston pin 105, such that the low compression ratio may be implemented.

In FIGS. 7 and 8, when oil is supplied to the first chamber 155 and the oil of the second chamber 157 returns to the first chamber 155, the piston 100 rises with the piston pin 105, such that the high compression ratio may be implemented.

Figure 9:
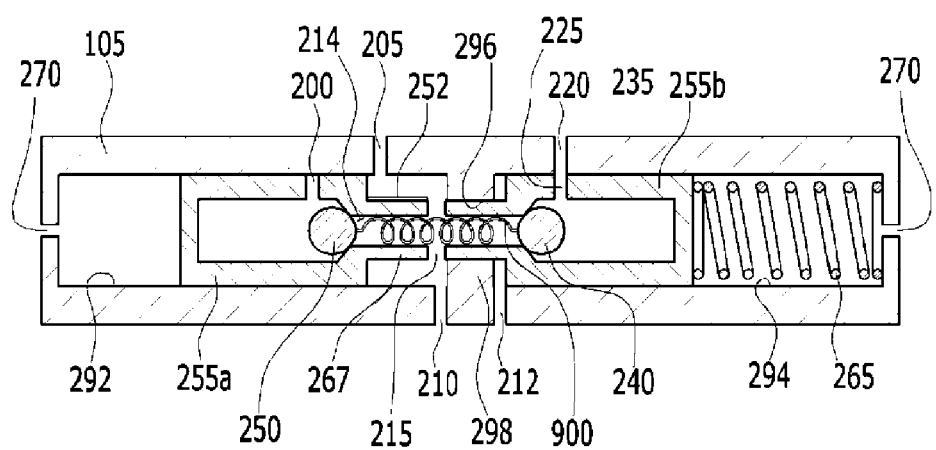
FIG. 9 is a cross-sectional view illustrating another structure of a check valve in a variable compression ratio device according to another exemplary embodiment of the present invention.

FIG. 9 is a cross-sectional view illustrating another structure of a check valve in a variable compression ratio device according to another exemplary embodiment of the present invention and the detailed description of the same or similar components as or to those of FIG. 2 will be omitted and main differences from FIG. 2 will be described.

Referring to FIG. 9, a first ball of the first check valve 250 and a second ball of the second check valve 240 are connected to each other by a check spring 900 and the check spring 900 has a structure of elastically pulling the first check ball and the second check ball.

Therefore, the first check valve 250 and the second check valve 240 are always operated by the check spring 900, thereby easily controlling oil to easily flow in one direction, relatively simplifying the structure of the check valve, reducing the number of components.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "interior", "exterior", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A variable compression ratio device supplying oil to a first chamber or supplying the oil to a second chamber to get a top dead center of a piston to go up and down, comprising:
   a piston pin having first and second plunger spaces provided at a first side and a second side therein, provided with a partition wall passage connecting between the first and second plunger spaces, provided with a first chamber connection passage connecting between the first chamber and the first plunger space and a second chamber connection passage connecting between the second chamber and the second plunger space, and provided with each of first and second supply passages through which the oil is supplied to the first and second plunger spaces;
   a plunger device including a first plunger that is disposed to reciprocate in the first plunger space, having a first check space formed therein, and provided with a first check passage connected to an outer circumferential surface from the first check space while the first check passage corresponds to the first chamber connection passage; a second plunger that is disposed to reciprocate in the second plunger space, having a second check space formed therein, and provided with a second check passage connected to an outer circumferential surface from the second check space while the second check passage corresponds to the second chamber connection passage; and a connection pipe that connects between the first and second plungers through the partition wall passage and has a pipe passage connecting between the first and second check spaces and is provided with an open passage from an inside circumferential surface toward an outer circumferential surface thereof;
   a first check valve disposed in the first check space to move oil from the pipe passage to the first check space in a first direction and a second check valve disposed in the second check space to move the oil from the pipe passage to the second check space in a second direction; and
   a return member elastically supporting the second plunger to one side.

2. The variable compression ratio device of claim 1, wherein
   in a state in which the first plunger and the second plunger are moved to one side,
   the second check passage and the second chamber connection passage are connected to each other, the oil supplied through the first supply passage and the oil of the first chamber are supplied to the second chamber through the open passage, the pipe passage, the second check valve, the second check passage, and the second chamber connection passage.

3. The variable compression ratio device of claim 1, wherein
   in a state in which the first plunger and the second plunger are moved to the other side,
   the first check passage and the first chamber connection passage are connected to each other, the oil supplied through the second supply passage and the oil of the second chamber are supplied to the first chamber through the open passage, the pipe passage, the first check valve, the first check passage, and the first chamber connection passage to implement a high compression ratio.

4. The variable compression ratio device of claim 1, wherein
   an outer diameter of the first plunger is larger than an inner diameter of the partition wall passage and an outer diameter of the second plunger is larger than an inner diameter of the partition wall passage.

5. The variable compression ratio device of claim 4, wherein
   the outer diameter of the first plunger is equal to that of the second plunger.

6. The variable compression ratio device of claim 4, wherein
   the first supply passage and the second supply passage are respectively connected to the first plunger space and the second plunger space, the oil supplied through the first supply passage is configured to be operated to move the first plunger to one side, and the oil supplied through the second supply passage is configured to be operated to move the second plunger to the other side.

7. The variable compression ratio device of claim 6, wherein
   when a force of the return member and a force of an oil pressure supplied through the first supply passage are larger than that of the oil pressure supplied through the second supply passage,
   the second check passage and the second chamber connection passage are connected to each other, the oil supplied through the first supply passage and the oil of the first chamber are supplied to the second chamber through the open passage, the pipe passage, the second check valve, the second check passage, and the second chamber connection passage to implement a low compression ratio.

8. The variable compression ratio device of claim 6, wherein
   when a force of an oil pressure supplied through the second supply passage is larger than that of the return member and that of the oil pressure supplied through the first supply passage,
   the first check passage and the first chamber connection passage are connected to each other, the oil supplied through the second supply passage and the oil of the second chamber are supplied to the first chamber through the open passage, the pipe passage, the first check valve, the first check passage, and the first chamber connection passage to implement a high compression ratio.

9. The variable compression ratio device of claim 6, wherein
   the return member is an elastic member disposed in the second plunger space to elastically support the second plunger to a first side.

10. The variable compression ratio device of claim 1, further including:
    an eccentric cam rotatably disposed on an outer circumferential surface of the piston pin connecting between the piston and a connecting rod,
    wherein the oil supplied to the first chamber rotates the eccentric cam in a first direction by a predetermined angle to get the top dead center of the piston to go up, and
    the oil supplied to the second chamber rotates the eccentric cam in a second direction by a predetermined angle to get the top dead center of the piston to go down.

11. The variable compression ratio device of claim 1, wherein
the first chamber is disposed at an upper portion of the piston pin in the piston and the oil supplied to the first chamber gets the top dead center of the piston to go up, and
the second chamber is disposed at a lower portion of the piston pin in the piston and the oil supplied to the second chamber gets the top dead center of the piston to go down.

12. The variable compression ratio device of claim 1, wherein
the open passage is connected to the first plunger space in a state in which the first and second plungers are moved in a first direction, and
the open passage is connected to the second plunger space in a state in which the first and second plungers are moved in a second direction.

13. A variable compression ratio device supplying oil to a first chamber or supplying the oil to a second chamber to get a top dead center of a piston to go up and down, including:
a piston pin having first and second plunger spaces connected to each other at a first side and a second side therein, provided with a first chamber connection passage connecting between the first chamber and the first plunger space and a second chamber connection passage connecting between the second chamber and the second plunger space, and provided with a supply passage through which the oil is supplied to the second plunger space;
a plunger device including a first plunger that is disposed to reciprocate, having an outer circumferential surface corresponding to an inside circumferential surface of the first plunger space, has a first check space formed therein, and is provided with a first check passage connected to an outer circumferential surface in the first check space, corresponding to the first chamber connection passage; a second plunger that is disposed to reciprocate, having an outer circumferential surface corresponding to an inside circumferential surface of the second plunger space, has a second check space formed therein, and is provided with a second check passage connected to an outer circumferential surface in the second check space, corresponding to the second chamber connection passage; and a connection pipe that connects between the first and second plungers, has a pipe passage connecting between the first check space and the second check space, is provided with an open passage from an inside circumferential surface toward an outer circumferential surface, and has a sealing structure formed between the outer circumferential surface and an internal circumferential surface of a partition wall passage;
a first check valve disposed in the first check space to move oil from the pipe passage to the first check space in a first direction and a second check valve disposed in the second check space to move the oil from the pipe passage to the second check space in a second direction; and
a return member elastically supporting the second plunger to one side.

14. The variable compression ratio device of claim 13, wherein
an outer diameter of the second plunger is larger than that of the first plunger.

15. The variable compression ratio device of claim 13, wherein
when a force of the return member is larger than that of an oil pressure supplied through the supply passage,
the second check passage and the second chamber connection passage are connected to each other, the oil supplied through the first supply passage and the oil of the first chamber are supplied to the second chamber through the open passage, the pipe passage, the second check valve, the second check passage, and the second chamber connection passage to implement a low compression ratio, and
when a force of the oil pressure supplied through the supply passage is larger than that of the return member,
the first check passage and the first chamber connection passage are connected to each other, the oil supplied through the second supply passage and the oil of the second chamber are supplied to the first chamber through the open passage, the pipe passage, the first check valve, the first check passage, and the first chamber connection passage to implement a high compression ratio.

16. The variable compression ratio device of claim 13, further including:
an eccentric cam rotatably disposed on an outer circumferential surface of the piston pin connecting between the piston and a connecting rod,
wherein the oil supplied to the first chamber rotates the eccentric cam in one direction by a predetermined angle to get the top dead center of the piston to go up, and
the oil supplied to the second chamber rotates the eccentric cam in a second direction by a predetermined angle to get the top dead center of the piston to go down.

17. The variable compression ratio device of claim 13, wherein
the first chamber is disposed at a lower portion of the piston pin in the piston, and
the second chamber is disposed at an upper portion of the piston pin in the piston.

18. The variable compression ratio device of claim 13, wherein
the open passage includes
a first open passage connected to the first chamber connection passage in the connection pipe in a state in which the first and second plungers are moved to a first direction; and
a second open passage connecting between the supply passage and the second chamber connection passage in a state in which the first and second plungers are moved in a second direction.

19. The variable compression ratio device of claim 13, wherein
the hydraulic pressure is formed between a first end surface of the first plunger and the first plunger space, and
vent openings through which the hydraulic pressure formed between a second end surface of the second plunger and the second plunger space is discharged to an outside are formed at first and second end portions of the piston pin, respectively.

20. The variable compression ratio device of claim 13, further including:
a check elastic member including a spring connecting between a first ball of the first check valve and a second ball of the second check valve and disposed to elastically pull the first and second balls to operate the first and second check valves.

\* \* \* \* \*